United States Patent
Gai et al.

(10) Patent No.: US 9,219,638 B2
(45) Date of Patent: Dec. 22, 2015

(54) APPARATUS AND METHOD FOR APPLYING NETWORK POLICY AT A NETWORK DEVICE

(71) Applicant: Cisco Technology, Inc., San Jose, CA (US)

(72) Inventors: Silvano Gai, Groveland, CA (US); Claudio DeSanti, Oakland, CA (US); James Paul Rivers, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/685,435

(22) Filed: Nov. 26, 2012

(65) Prior Publication Data

US 2013/0086266 A1    Apr. 4, 2013

Related U.S. Application Data

(63) Continuation of application No. 12/140,224, filed on Jun. 16, 2008, now Pat. No. 8,321,908.

(60) Provisional application No. 60/944,443, filed on Jun. 15, 2007.

(51) Int. Cl.
   G06F 7/04      (2006.01)
   H04L 12/24     (2006.01)
   H04L 29/06     (2006.01)

(52) U.S. Cl.
   CPC .............. *H04L 41/00* (2013.01); *H04L 63/101* (2013.01)

(58) Field of Classification Search
   None
   See application file for complete search history.

(56) References Cited

U.S. PATENT DOCUMENTS

| 7,155,494 | B2 | 12/2006 | Czeiger et al. |
| 7,430,203 | B2 | 9/2008 | Millet et al. |
| 7,684,398 | B2 | 3/2010 | George et al. |
| 7,978,695 | B2 | 7/2011 | George et al. |
| 8,321,908 | B2 | 11/2012 | Gai et al. |
| 2003/0231631 | A1* | 12/2003 | Pullela .......................... 370/392 |
| 2004/0008702 | A1* | 1/2004 | Someya et al. ............... 370/401 |
| 2006/0109850 | A1* | 5/2006 | Otani et al. ................ 370/395.2 |
| 2006/0251111 | A1 | 11/2006 | Kloth et al. |
| 2008/0002687 | A1 | 1/2008 | George et al. |
| 2008/0056300 | A1* | 3/2008 | Williams ...................... 370/466 |
| 2008/0095152 | A1 | 4/2008 | George et al. |
| 2009/0037977 | A1 | 2/2009 | Gai et al. |

OTHER PUBLICATIONS

"U.S. Appl. No. 12/140,224 , Response filed Apr. 3, 2012 to Non Final Office Action mailed Jan. 5, 2012", 10 pgs.

(Continued)

*Primary Examiner* — Saleh Najjar
*Assistant Examiner* — William G O'Hara

(57) ABSTRACT

This document discusses, among other things, applying network policy at a network device. In an example embodiment fiber channel hard zoning information may be received that indicates whether a fiber channel frame is permitted to be communicated between two fiber channel ports. Some example embodiments include identifying a media access control addresses associated with the fiber channel ports. An example embodiment may include generating one or more access control entries based on the fiber channel identifications of the fiber channel ports and the zoning information. The access control entries may be distributes to an Ethernet port to be inserted into an existing access control list and used to enforce a zoning policy upon fiber channel over Ethernet frames.

22 Claims, 8 Drawing Sheets

(56) References Cited

OTHER PUBLICATIONS

"U.S. Appl. No. 12/140,224, Examiner Interview Summary mailed Jul. 19, 2012", 3 pgs.

"U.S. Appl. No. 12/140,224, Final Office Action mailed Apr. 12, 2012", 10 pgs.

"U.S. Appl. No. 12/140,224, Non Final Office Action mailed Jan. 5, 2012", 9 pgs.

"U.S. Appl. No. 12/140,224, Notice of Allowance mailed Jul. 26, 2012", 10 pgs.

"U.S. Appl. No. 12/140,224, Response filed Jul. 12, 2012 to Final Office Action mailed Apr. 12, 2012", 9 pgs.

"U.S. Appl. No. 12/140,224, Restriction Requirement mailed Oct. 11, 2011", 6 pgs.

\* cited by examiner

US 9,219,638 B2

APPARATUS AND METHOD FOR APPLYING NETWORK POLICY AT A NETWORK DEVICE

RELATED MATTERS

This application is a continuation of and claims the benefit of priority under 35 U.S.C. §120 to U.S. Application Ser. No. 12/140,224, filed Jun. 16, 2008, which in turn, claims the benefit of priority under 35 U.S.C. 119(e) of U.S. Provisional Application No. 60/944,443 filed Jun. 15, 2007, entitled "APPARATUS AND METHOD FOR APPLYING NETWORK POLICY AT NETWORK DEVICE," the entire contents of each of which are incorporated herein by reference.

TECHNICAL FIELD

This patent document pertains generally to network communication and more particularly, but not by way of limitation, to applying network policy at a. network device.

BACKGROUND

Network policy enforcement is commonly applied to nodes in a network. For example, network policy enforcement may be applied at an input/output (I/O) interface for example to: control anode's ability to access other nodes, control a node's scope of privileges, prevent denial of service attacks and to enforce firewall policies. An appropriate policy may be selected based on the identification (ID) or lack thereof of a node or a user.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
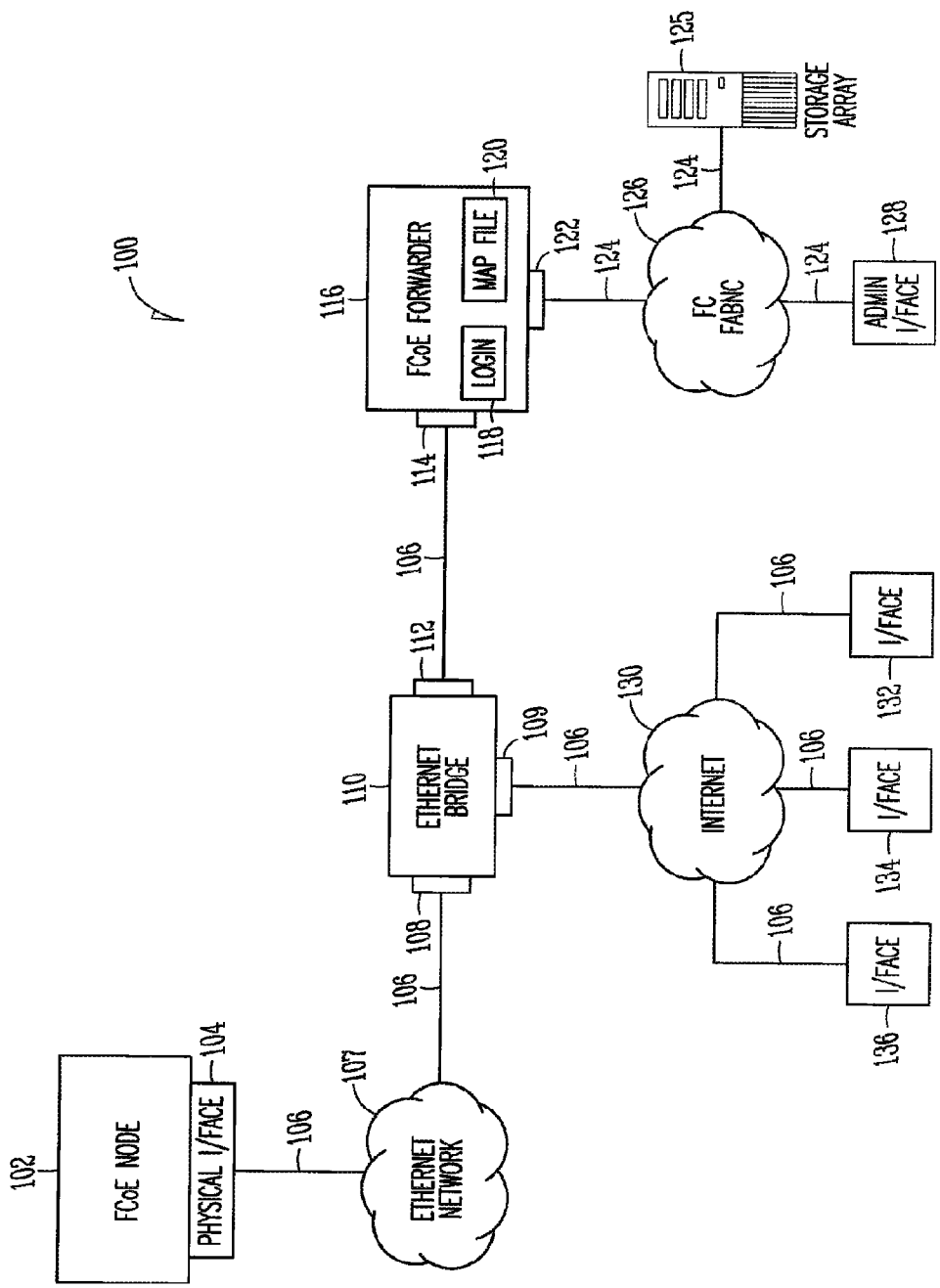
FIG. 1 is a block diagram illustrating a network system in accordance with an example embodiment.

The following detailed description includes references to the accompanying drawings, which form a part of the detailed description. The drawings show, by way of illustration, specific embodiments in which the invention may be practiced.

Overview

This overview is intended to provide an overview of the subject matter of the present patent application. It is not intended to provide an exclusive or exhaustive explanation of the invention. The detailed description is included to provide further information about the subject matter of the present patent application.

A method and system are described for providing at an Ethernet enabled device or interface (e.g., an Ethernet switch), a network policy behavior that is equivalent to that of fiber channel (FC) hard zoning (e.g. also referred to as zoning), which is traditionally applied to FC frames by an FC device (e.g., an FC switch). In example embodiments, the FC hard zoning that is configured to regulate FC IDs assigned to FC ports may be enforced upon Ethernet frames at the data link layer by regulating media access control (MAC) addresses with Ethernet access control lists (ACLs).

In various example embodiments, FC hard zoning policy information received by an FCoE forwarder is converted into access control entries (ACEs) to be inserted in one or more ACLs. In some example embodiments, the zoning policy may be enforced upon FCoE frames at an I/O port of an Ethernet enabled device (e.g. a network interface card (MIC)), by applying an Ethernet ACL.

In some example embodiments an FCoE forwarder generates a set of ACEs corresponding to a zoning policy for an FC ID and a MAC address associated with the FC ID. In an example embodiment, ACEs may be generated when a system administrator manually or automatically updates a zoning policy. Some example embodiments may include generating the ACEs based on an FCoE node (e.g., FCoE enabled I/O card) logging in to an FCoE network over a particular port (e.g., with a FLOGI or NPIV request and accept exchange protocol). Logging in to the FCoE network may include the FCoE node requesting an FC ID from an FCoE forwarder and the FCoE node receiving the FC ID and an assigned MAC address from the FCoE enabled module.

The example FCoE forwarder may distribute the set of ACEs to an Ethernet interface (e.g., an Ethernet port) where the ACEs may be inserted into Ethernet ACLs, which may be used to enforce the zoning policy upon incoming FCoE frames.

In some example embodiments, a virtual FC port (e.g., VN_Port) associated with a single Ethernet I/O port is assigned MAC address based on the FC ID of the virtual FC port. In a substantially similar way as described above, an Ethernet port may use ACEs and ACLs to enforce FC zoning upon frames having MAC addresses associated with the FC ID of the virtual FC enabled I/O module.

These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

FIG. 1 is a block diagram showing an example network 100, in accordance with an example embodiment. The example network 100 is shown to include an FCoE node 102 communicatively coupled to an Ethernet network 107 and an Ethernet bridge 110 via the transmission media 106. The physical interfaces 104 and 108 connect the FCoE node 102 and the Ethernet bridge 110 respectively to the transmission media 106. The Ethernet bridge 110 is shown to be communicatively coupled to the Internet cloud 130 via the physical interface 109 and the transmission media 106. The Internet cloud 130 is shown to be communicatively coupled to Internet interfaces 132, 134 and 136 via the transmission media 106.

The Ethernet bridge 110 is shown to be communicatively coupled to an FCoE forwarder 116 via the physical interfaces 112 and 114 via the transmission media 106. The FCoE forwarder 116 is shown to be communicatively coupled to the FC fabric 126 via the physical interface 122 and the transmission media 124. The FC fabric 126 is shown to be communicatively coupled to a storage array 125 via the transmission media 124, The FC fabric 126 may also be coupled to an administrator interface 128 via the transmission media 124.

The Ethernet network 107 may be a type of Ethernet local area network (LAN) over which frames are transferred between network nodes such as an FCoE node 102 and the Ethernet bridge 110. As nodes on the Ethernet network 107, the FCoE node 102 and the Ethernet bridge 110 are each associated with one or more MAC addresses. MAC addresses include information used to identify network nodes connected to the Ethernet network 107, A MAC address is an element of the data link layer of the open systems interconnection (OSI) basic reference model.

FCoE protocol encapsulates FC protocol within an Ethernet frame that includes one or more MAC address to identify source and destination network nodes. FCoE frames may allow for the transfer small computer system interface (SCSI) protocol data over Ethernet. Relative to the Ethernet network 107 the FCoE node 102 is an Ethernet node, while relative to a FC network, the FCoE node may be considered to be a FC node (discussed in more detail below). The FCoE forwarder 116 may also be a member of an Ethernet and a FC network.

The Example Ethernet bridge 110 may connect multiple network devices, via the transmission media 106 and its physical interfaces 108, 109 and 112. In an example embodiment, functionality of the Ethernet bridge 110 includes using source and/or destination MAC addresses to provide security, switching, forwarding, flow control or other Ethernet bridge services to the Ethernet network. Some Ethernet bridges 110 may include a capability to affect frames based on other layers of the OSI model.

The physical interfaces 108, 109 and 112 of the Ethernet bridge 110 may include MCS to receive and transmit frames. A physical interface 108, 109 and 112 such as a NIC may process a received frame to determine a MAC address of the frame's source and a MAC address of the frame's destination port. The physical interfaces 108, 109 and 112 may be associated with one or more ports and/or MAC addresses at which frames may be received from other ports (e.g., the physical interface 104) and transmitted to the other ports.

In an example embodiment, the Ethernet network 107 is implemented in a configuration to reduce frame loss between network nodes. Such a configuration may be referred to as lossless Ethernet. In example embodiments in which lossless Ethernet is employed, physical interfaces (e.g., 104, 108, 109, 112 and 114) connected to the Ethernet network include Ethernet MACs supporting full duplex, 2.5 kilobyte jumbo frames over the transmission media 106. The physical interfaces (e.g., 104, 108, 109 and 112) may further implement an Ethernet extension allowing a pause mechanism to avoid Ethernet frame loss due to congestion. Ethernet bridging elements (e.g., Ethernet bridge 110 and/or bridging element within FCoE forwarder) that are communicatively coupled to the example network 107 may be adapted to support the capabilities of the Ethernet MACs of the above configuration.

The FCoE node 102 is a network node that is able to communicate Ethernet protocol and SCSI over a single physical interface 104. in an example embodiment, the FCoE Node is a FC node with one or more Ethernet MACs coupled to an FCoE controller (discussed in more detail below).

The FCoE node 102 may be communicatively coupled to a physical machine (e.g., a microprocessor-based computer, not shown) and may interface with one or more operating systems running on the physical machine. In an example embodiment, the physical machine may include one or more central processing units (CPUs) that execute instructions to implement one or more virtual machines on the physical machine.

In a virtual environment (e.g., a virtual server), a single physical device may present the appearance to other hardware and software that the single physical device is multiple logical devices (e.g., multiple virtual devices). Some network devices (e.g., physical devices) one or more virtual interfaces each of which connects one or more virtual machines to the network.

Virtual interfaces may allow applications, services and operating systems to separately access a network through the virtual interfaces using a common physical I/O to the network. When virtual interfaces are used, network policy may be enforced with hardware or software. The enforcement may occur within each network node or external to each node but within the network.

A virtual machine may execute one or more operating systems that in turn may execute multiple software applications.

In some example embodiments, the FCoE node 102 includes one or more virtual ports. The example virtual ports may serve as an interface between an operating system executed by a physical or virtual machine and the transmission media 106 connected by the physical interface 104.

The FCoE forwarder 116 may receive FCoE frames from FCoE nodes such as the FCoE node 102 and forward FCoE frames or FC frames (e.g., decapsulated from the FCoE frame) based on a FC destination ID encapsulated within the FC frame (and e.g., FC frames are encapsulated within FCoE frames). In various example embodiments, the FCoE forwarder includes a FC switch (not shown) and a physical interface 122 that includes a host bus adapter (HBA) to communicate with FC devices connected to the FC fabric 126 over the transmission media 124 (e.g., twisted pair, fiber optic cables, etc). The FCoE forwarder 116 is shown to include a logon module 118 to facilitate network logon and a mapping module 120 to map FC zoning policy into ACEs. The logon module 118 and the mapping module 120 are to be discussed in more below).

The FC fabric 126 may include an FC switch (not shown) to switch FC frames received from the FCoE forwarder 116 to various disks within the storage array 125.

The administrator interface 128 is to be used by a storage administrator or other authorized party to perform various administrative tasks In an example embodiment FC zoning rules may be administered to the PC fabric via the administrator interface 128. FC zoning rules may limit the ability of an FC node to access other FC nodes and or PC switches. FC zoning rules may include grouping FC nodes into subgroups within an FC fabric to provide security and/or decrease traffic, etc. in an example embodiment, zoning rules may be applied to FCoE frames transmitted from or to nodes such as the FCoE node 102.

The Internet cloud 130 represents a network that may share the transmission media 106 with the Ethernet network 107. In an example embodiment IP packets of the Internet protocol, Ethernet frames of the Ethernet protocol and FCoE frames of the FCoE protocol may each be carried over the transmission media 106.

Figure 2:
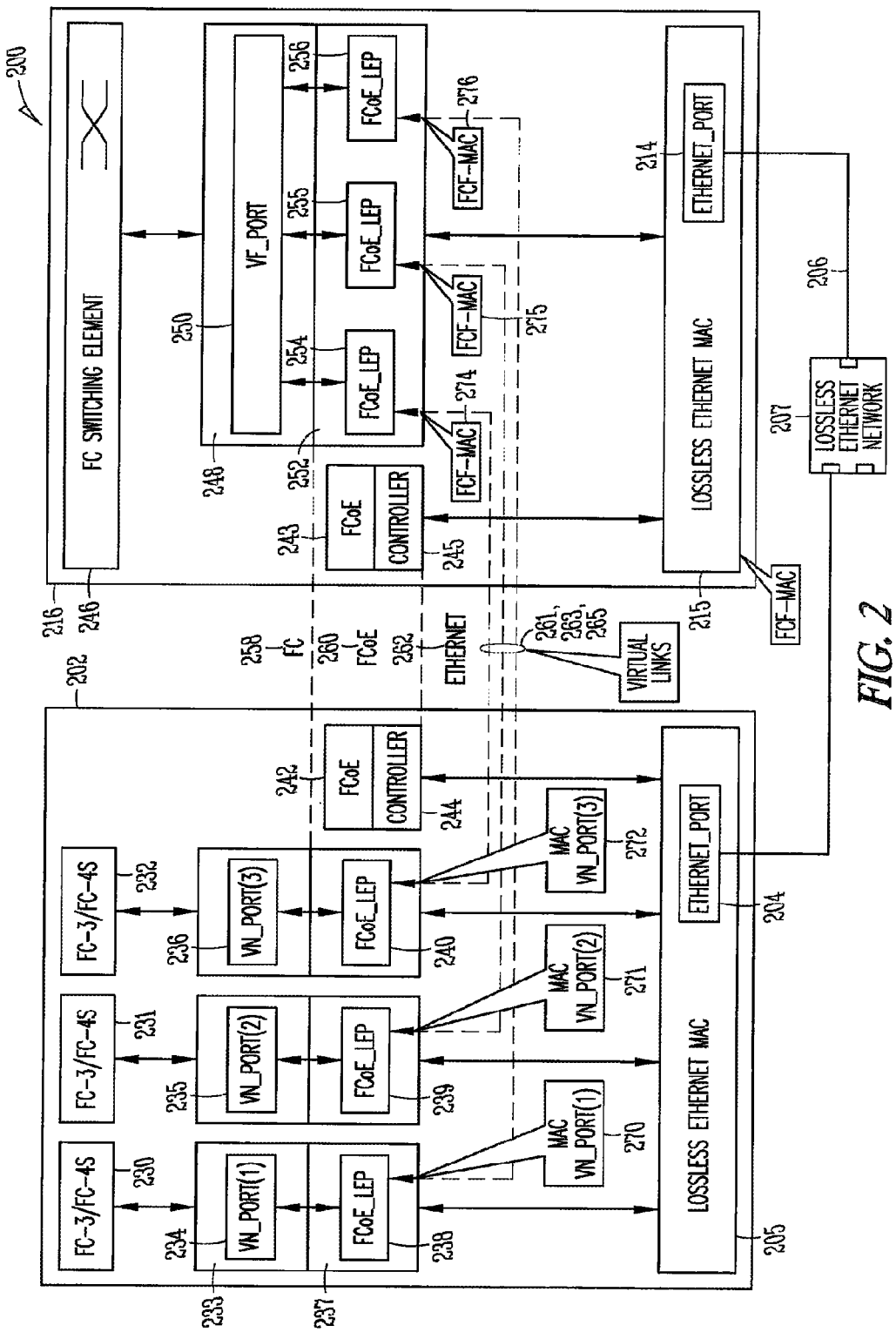
FIG. 2 is a block diagram showing a network connection between a fibre channel over Ethernet (FCoE) node and a FCoE forwarder 216, in accordance with an example embodiment.

FIG. 2 is a block diagram showing a network connection 200 between an FCoE node 202 and an FCoE forwarder 216, in accordance with an example embodiment. The FCoE node 202 and the FC forwarder 216 of FIG. 2 may be substantially similar to the FCoE node 102 and the FCoE forwarder 116 of FIG. 1. The Ethernet port 204 of the FCoE node 202 is shown to be communicatively coupled to the Ethernet port 214 of the FCoE forwarder 216, the Ethernet network 207 via the transmission media 206.

Features within the FCoE node 202 and the FCoE forwarder 216 may be organized into a FC layer 258, an FCoE layer 260 and an Ethernet layer 262.

In the FC layer 258 of the FCoE node 202, the upper FC levels 230-232 process data received from operating systems (not shown) wishing to transmit data to a FC node within the FC network. The VN_Ports 234-236 may receive FC frames from the upper FC levels 230-232 and forward them to the FCoE layer. The VN_ports 234-236 may receive FC frames from the FCoE layer 260 and forward the frames to the upper layers 230-232.

A VN_Port may be the data forwarding component of a FC entity 233 that emulates an N_Port (e.g., a FC protocol N_Port) and is dynamically instantiated by a logon module (e.g., the logon module 244) upon successful completion of a FC network logon procedure (e.g. FIP, FLOGI, NPIV etc., described below) with the FCoE forwarder 216. A VN_Port may be assigned an address (e.g., an FCoE MAC address) by the FCoE forwarder 216 during the logon procedure.

The FCoE layer 260 of the FCoE node 202 is to receive FC frames from the VN_Ports 234-235 and FCoE frames from the Ethernet MAC 205.

An FCoE framer in the FCoE layer may perform encapsulation of FC frames into FCoE frames in transmission and the decapsulation of FCoE frames into FC frames in reception, An FCoE framer on an FCoE node (e.g., the FCoE framer 238, 239 or 240) may form an endpoint of a virtual link (e.g., one of the virtual links 261, 263 or 265) between the FCoE node 202 and an FCoE framer (e.g. the FCoE framer 256, 255 or 254) on an FCoE forwarder. When encapsulating FC frames into FCoE frames, the MAC address of a local link endpoint (e.g. on the FCoE node 202) may be used as a source address and the MAC address of a remote link endpoint (e.g. on the FCoE forwarder 216) may be used as a destination address of the FCoE frame. When decapsulating FC frames from FCoE frames, the FCoE framer may verify that a destination address of the receive FCoE frame is equal to the MAC address of the local endpoint and may verify that the source address of the received FCoE frame is equal to the MAC address of the remote link endpoint.

The MAC address of the local link endpoint may be a MAC address associated with its VN_Port (e.g., the MAC addresses $VN\_Port(1)\text{-}VN\_Port(3)$ 270-273) and the remote link endpoint address is the FC forwarder 216 MAC address associated with the Ethernet MAC 215 and remote VF_Port (e.g., FCF MAC 274-276).

The FC layer 258 of the FCoE forwarder 216 includes the FC switching element 246. The FC switching element may be a functional en performing FC switching among other FC switches and to FC nodes.

A VF_Port may be a data forwarding component of an FC entity 248 that emulates an F_Port (e.g., a FC protocol F_Port) and is dynamically instantiated upon successful completion of a logon procedure by operation of the logon module 245. A VF_Port such as the VF_Port 250 receives FC frames from the FC switching element (e.g., the FC switching element 246) and sends them to an appropriate FCoE framer (e.g., framers 254-256) for encapsulation and transmission over a virtual (e.g., out of the Ethernet port 214 and over the transmission medium 206).

VN_Ports instantiated upon successful logon (e.g., the VN_Ports 234-236) as described above may be associated to the same VF_Port instantiated by the VF_Port (e.g., the VF_Port 250) upon the successful logon (e.g., facilitated by the logon module 245).

At the FCoE layer 260, the FCoE framers 254-256 may perform substantially the same functions as the FCoE framers 238-240 described above.

Referring again to FIG. 1, as described above, the FCoE node 102 may include multiple virtual ports (e.g., VN_Ports 234-236) to interface with one or more operating systems and for virtual links (e.g., the virtual FC links 261-263) over Ethernet with the FCoE forwarder 116.

Figure 3:
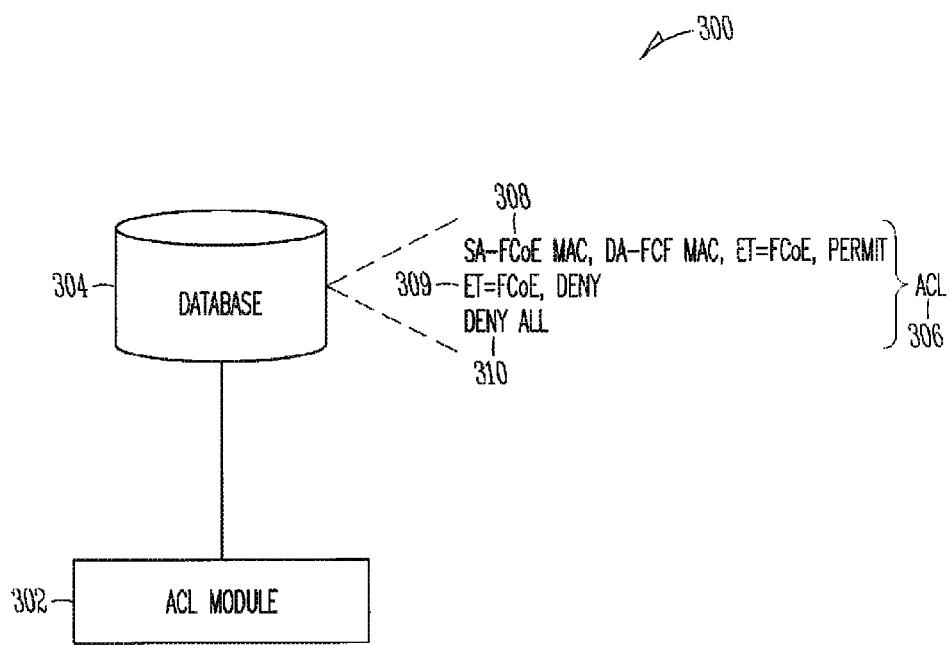
FIG. 3 shows a diagram illustrating an example mechanism for applying an ACL to a frame, in accordance with an example embodiment.

FIG. 3 shows a diagram illustrating an example mechanism 300 for applying an ACL 306 to a frame, in accordance with an example embodiment. An ACL 306 may include a list composed of ACEs 308-311 that may be referenced to determine whether certain privileges are to be granted or not to be granted to subject matter. In example embodiments, ACLs may be used to regulate FCoE frames based on an FCoE frame's MAC source address and/or destination address.

Figure 4:
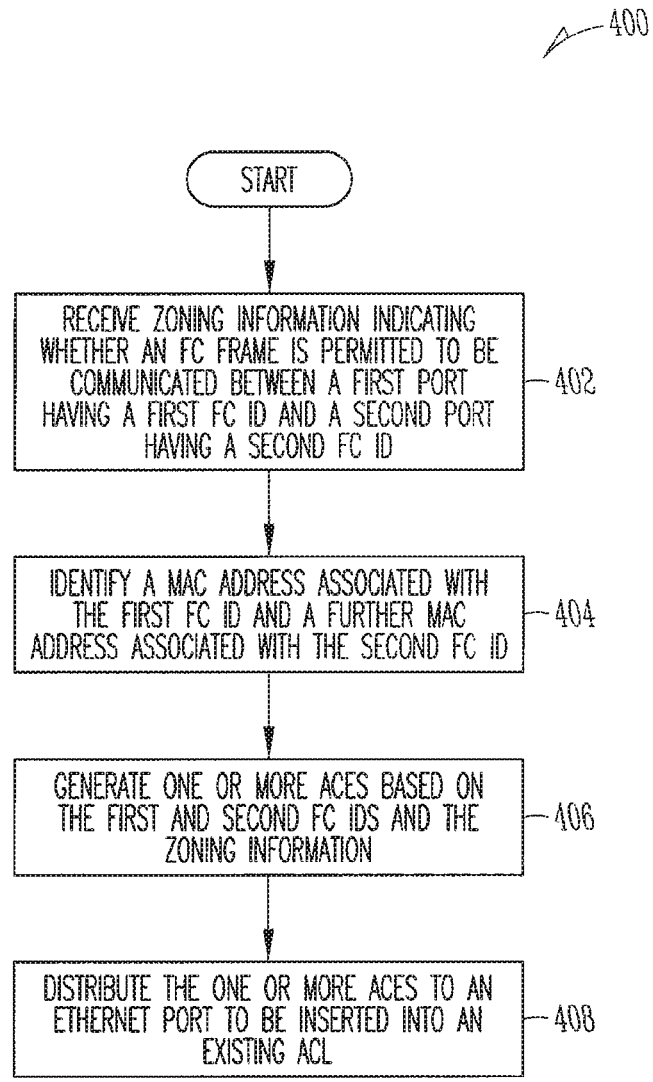
FIG. 4 is a flow diagram illustrating an example method for propagating FC hard zoning rules in an Ethernet network, in accordance with an example embodiment.

FIG. 4 is a flow diagram illustrating an example method 400 for propagating FC hard zoning rules in an Ethernet network, in accordance with an example embodiment. The example method 400 may be implemented at least in part by the mapping module 120 of FIG. 1. The mapping module 120 may be hardware, software or a combination of hardware and software. In some example embodiments, the mapping module 120 includes instructions executed by a processor (not shown) integrated into the FCoE forwarder 116.

At block 402, the method 400 may include receiving zoning information indicating whether an FC frame is permitted to be communicated between a first port having a first FC ID and a second port having a second FC ID. In FIG. 1, FC zoning policy may be pushed to the FCoE forwarder 116 by the Administrative interface 128 across the FC fabric 126 over the transmission media 124 where the zoning information may be received by an HBA (e.g., the physical interface 122). In an example embodiment, the zoning information is a rule that determines whether a VN_Port (e.g., having an FC ID) within the FCoE node 102 may connect with a VF_Port within the FCoE forwarder 116. In some example embodiments, the pushed zoning information is an update to existing zoning policy currently being enforced.

After a virtual port has logged on, an association may be established between the virtual port's assigned PC ID and the virtual port's MAC address. As will be described below, each virtual port (e.g., VN_Port 234-236 in FIG. 2) is assigned an FC ID when the virtual port logs on to a particular domain with an FCoE forwarder. Also during logon, an FCoE forwarder may assign a MAC address to the virtual port.

In some example embodiments, the FCoE forwarder 116 is to derive a MAC address for the VN_Port within the FCoE node 102 that is based on the assigned FC ID. Alternatively or additionally, the VN_Port may select its own MAC address and the FC Forwarder may associate the assigned FC ID with the VN_Port's selected MAC address in a data structure.

At block 404, the example method may include identifying a MAC address associated with the first FC ID and a further MAC address associated with the second FC ID. In some example embodiments, the mapping module 120 may reference a table to identify MAC addresses previously associated (e.g., following domain logon) with assigned FC IDS. In various example embodiments, MAC addresses derived by the FCoE forwarder 116 are 48 bits long and 24 of the bits encode the assigned FC ID. The mapping module 120 may use the first and second FC IDs as indexes to find the FC IDs within the derived MAC address.

At block 406, the example method 400 includes generating one or more ACEs based on the first and second FC IDs and the zoning information The mapping module 120 may extract the policy from the zoning information and apply it to the MACs identified as being associated with the first ands second FC IDs. For example, in FIG. 2, and ACE may relate to the virtual link 261 formed between the MAC address VN_Port 20 and VF_Port 256.

At block 408, the example method 400 may include distributing the one or more ACEs to an Ethernet port to be inserted into an existing ACL. The ACEs may be transmitted over the Ethernet network.

Figure 5:
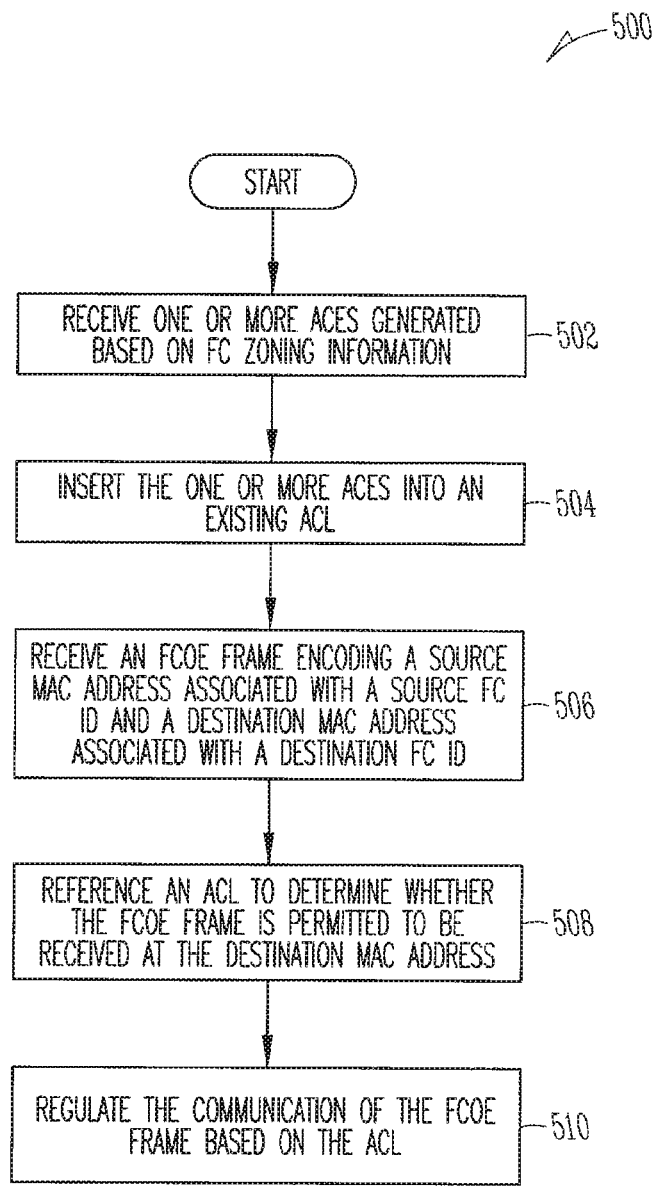
FIG. 5 is a flow diagram of a method for enforcing network policy derived from FC hard zoning policy, in accordance with an example embodiment.

FIG. 5 is a flow diagram illustrating an example method 500 for enforcing FC zoning with an ACL, in accordance with an example embodiment. For example, in FIG. 1 the physical interfaces 104, 108, 112 and 114 may enforce ACLs on frames traveling between the FCoE node 102 and the FCoE forwarder 116. Alternatively or additionally, instructions may be executed outside of the physical interfaces 104, 108, 112 and 114 but along the path connecting virtual ports.

At block 502, the example method 500 may include receiving one or more ACEs generated based on FC zoning information. In some example embodiments, the mapping module is to generate Ethernet ACEs that may be inserted into existing ACLs at specific Ethernet ports that connect the transmission media 106 carrying virtual links between a VN_Port within the FCoE node 102 and a VF_Port within the FCoE forwarder 116. In FIG. 3, ACL modules positioned along the path of the virtual link (e.g., in the Ethernet ports 114, 112, 108 and 106) may receive one or more ACE from the mapping module 120.

At block 504 the example method 500 may include inserting the one or more ACEs into an existing ACL. Referring to FIG. 3, the example ACL module 302 may access a database 304 to insert the one or more ACE into the example ACL 306.

At block 506, the example method 500 may include receiving an FCoE frame encoding a source MAC address associated with a source FC ID and a destination MAC address associated with a destination FC ID, and at block 508 referencing an ACL to determine whether the FCoE frame is permitted to be received at the destination MAC address.

In FIG. 3, the source and destination MAC addresses of a received FCoE frame may be forwarded to the ACL module 302, which may be implemented in any appropriate ports or network devices as described above. The ACL module 302 may identify an applicable ACL within the database 304 and search each ACE 308-311 for source MAC address, destination MAC addresses and ethertype matching those appearing in the received FCoE frame. In an example embodiment, the ACL module sequentially searches each ACE within the ACL until a match is identified.

At block 510, the example method 500 may include regulating the communication of the FCoE frame based on the ACL. in FIG. 3, when the ACL module 302 identifies a matching ACE 308-311 within the ACL 306, the ACL module 302 may regulate the FCoE frame according to the privileges indicated in the ACE. In FIG. 3, the ACE 308 indicates that the FCoE frame should be permitted to reach the destination MAC address when the source MAC address is MAC VN_Port(1), the destination MAC address is FCoE forwarder MAC and the ethertype is FCoE. An FCoE frame may not be permitted to reach the destination MAC address in cases that a matching ACL indicates that the frame should be denied. The example ACE 309 indicates that a frame that does not include the MAC addresses in the ACE 308 but indicates the FCoE ethertype is to be denied. it may be noted that example embodiments of regulating FCoE frames are not limited to virtual links between an FCoE node and an FCoE forwarder. ACLs may be applied to regulate traffic between any network device that transmits and receives FCoE frames over Ethernet (e.g., traffic between two FCoE forwarders).

In some example embodiments, mapping of the FC zoning policy to ACEs described above may occur when the administrator interface 128 pushes zoning information to the FCoE fabric 126. Alternatively or additionally, mapping of the zoning policy to ACEs may occur when an FCoE node (e.g., the FCoE node 102) completes a logon process with an FCoE forwarder (e.g., the FCoE forwarder 116) to instantiate a VN_Port.

Figure 6:
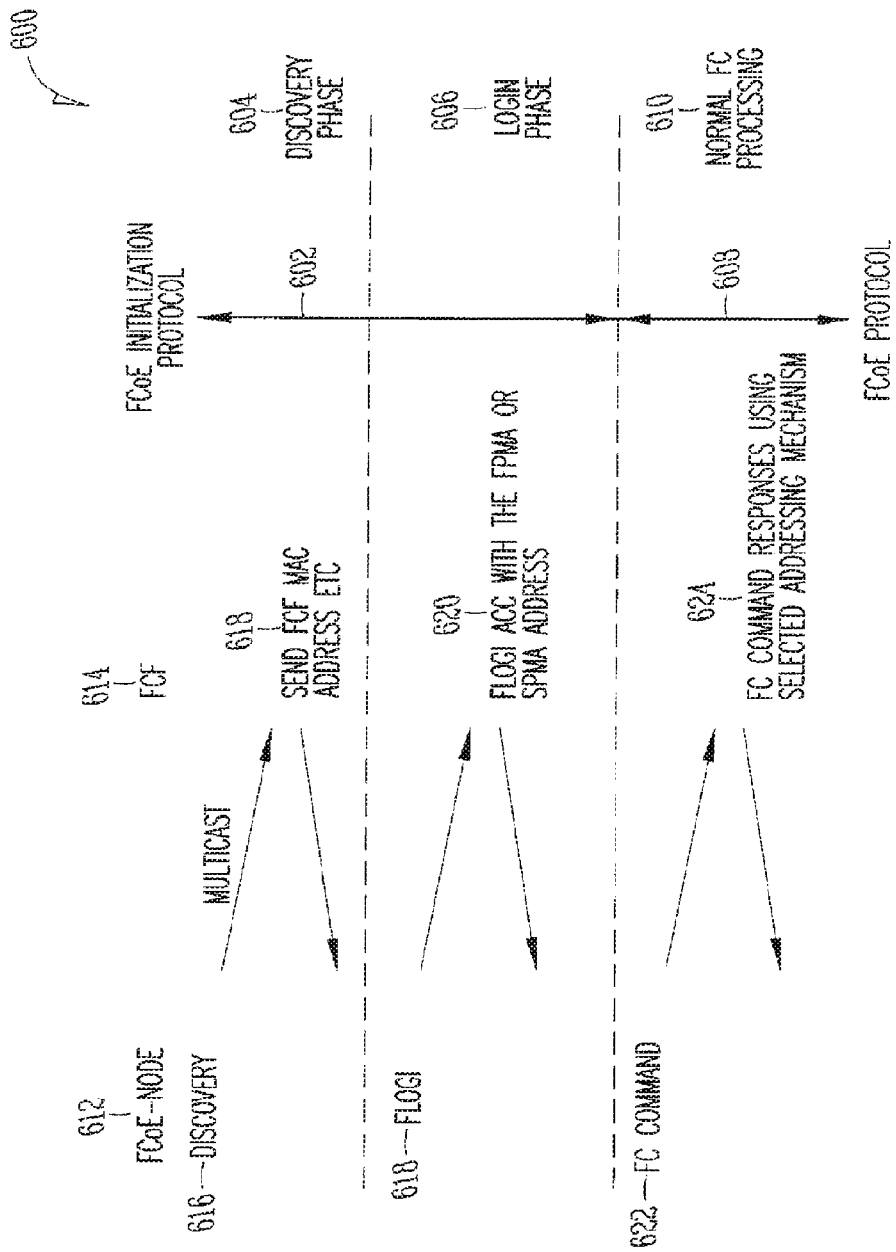
FIG. 6 is a flow ladder diagram illustrating a domain logon process, in accordance with an example embodiment.

FIG. 6 is a flow ladder diagram 600 illustrating a domain logon process, in accordance with an example embodiment. A VN_Port's initial logon may include two phases. An FCoE node 612 may perform a first phase 602 with an FCoE forwarder 614 using an FCoE initialization protocol (FIP). The HP protocol may be distinguished from the FCoE protocol by a different ethertype. The HP protocol may be dedicated to controlling connections between ports.

The first phase 602 includes the discovery phase 604 and the login phase 606. The discovery phase may allow the FCoE node 612 to be visible by the FCoE forwarder 614. In the discovery phase the FCoE node 612 may multicast a FIP frame soliciting the FCoE forwarder 614. The FCoE forwarder 614 may send its MAC address 618 in response to the request.

The login phase 606 may include the FCoE node 612 transmitting an FC FLOGI command to be assigned an FC ID from the FCoE forwarder 614 and begin to receive FC services. In some example embodiments, the FCoE node 612 may also include a desired MAC address (e.g., a server provided MAC address (SPMA)) with the FLOGI command. In response, the FCoE forwarder 614 may respond with a FC FLOGI ACC to accept the FCoE node's request. in example embodiment, the FCoE forwarder 614 is to include an assigned FC ID and assigned FCoE MAC address (e.g., a MAC VN_Port(1.) of FIG. 2). In some example embodiments, the FCoE forwarder 614 adopts the FCoE node's 612 desired MAC address; in other example embodiments, the FCoE forwarder 614 defines the assigned MAC address (e.g., a fabric provided MAC address (FPMA)) based on an assigned 24 bit FC ID (e.g., a 24 bit organizationally unique identifier (OUI) concatenated with the 24 hit FC ID in a 48 bit MAC address).

A second phase 608 may be communication between the FCoE node 612 and the FCoE Forwarder using the FCoE protocol. The second phase 608 may include normal FC processing 610 in which the FCoE node 612 issues an FC command (e.g., PLOGI/PRLI to connect with other VN_Ports) and the FCoE forwarder 614 responds, addressing the FCoE node 612 by its assigned MAC address.

Figure 7:
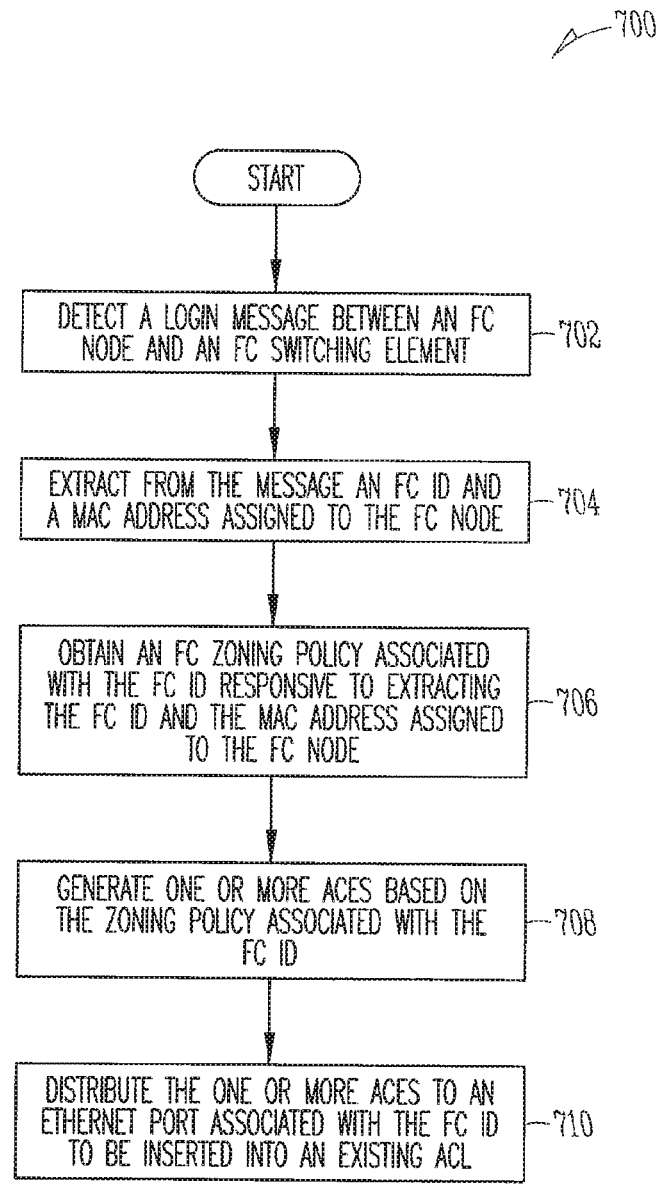
FIG. 7 is a flow diagram illustrating a further example method for propagating FC hard zoning rules in an Ethernet network, in accordance with an example embodiment.

FIG. 7 is a flow diagram illustrating a further example method 700 for propagating FC hard zoning rules in an Ethernet network, in accordance with an example embodiment, The example method 700 may be implemented by the mapping module 120 of FIG. 1. In some example embodiments, the mapping module may be located outside of the FCoE forwarder 116 but remain communicatively coupled with the FCoE forwarder 116.

At block 702, the example method 700 may include detecting a login message between an FC node and an FC switching element (e.g., the FCoE forwarder 116). Referring to FIG. 1, the mapping module 12.0 may detect that the login module 118 has sent or is to send an accept message (e.g., the message 620 in FIG. 6).

At block 704, the example method 700 may include extracting from the message an FC ID and a MAC address assigned to the FC Node. In some example embodiments, the mapping module 120 may request a copy of the message from the login module 118. In Other example embodiments, the mapping module (e.g., located outside of the FCoE forwarder 116) may snoop the transmission media 106 for the message including the FC ID and the MAC address assigned to the PC Node.

At block 706, the example method 700 may includes obtaining an zoning policy associated with the FC ID responsive to extracting the FC ID and the MAC address assigned to the FC node. In an example embodiment, the mapping module 120 may request from a FC switch (not show) within the FC fabric 126, a zoning policy corresponding to the FC At block 708, the example method 700 may include generating one or more ACEs based on the zoning policy associated with the FC ID. The mapping module 120 or other software or hardware may generate such ACEs as described with respect to FIG. 4.

At block 710, the example method may include distributing the one or more ACEs to an Ethernet port associated with the FC ID to be inserted into an existing ACL.

The example embodiments described herein may be implemented in software, hardware or a combination thereof. For example, in some example embodiments, the methods described herein may be implemented by computer program product or software which may include a machine or computer-readable medium having stored thereon instructions which may be used to program a computer (or other electronic devices). In other example embodiments, the functionality/methods described herein may be performed by specific hardware components (e.g., integrated circuits) that contain hard-wired logic for performing the functionality, or by any combination of programmed computer components and custom hardware components.

Figure 8:
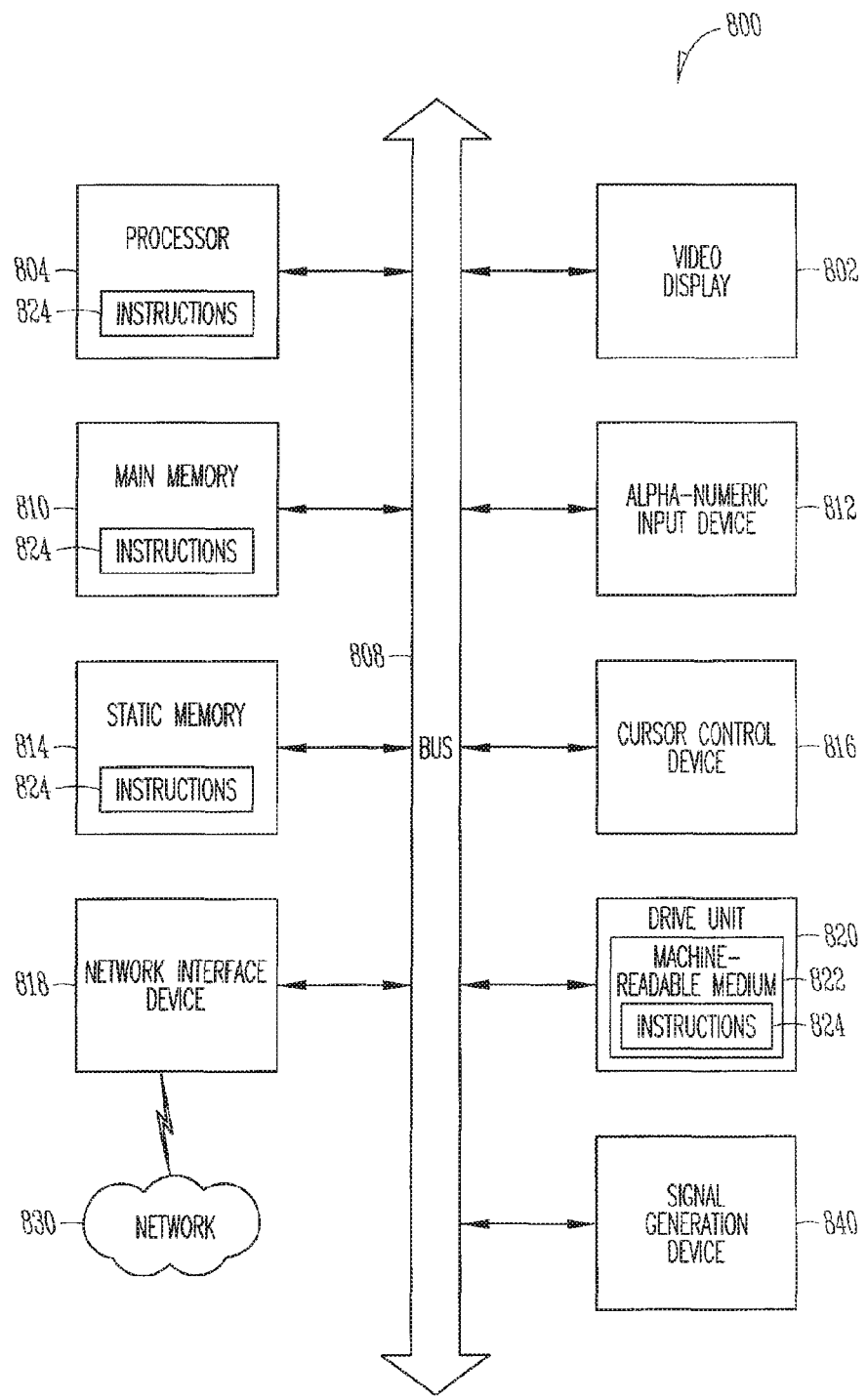
FIG. 8 shows a diagrammatic representation of machine in the example form of a computer system, in accordance with an example embodiment.

FIG. 8 shows a diagrammatic representation of machine in the example form of a computer system 800 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 804 (e.g., a central processing unit (CPU), a graphics processing unit (GPU) or both), a main memory 810 and a static memory 814, which communicate with each other via a bus 808. The computer system 800 may further include a video display unit 802 (e.g., a liquid crystal display (LCD) or a cathode ray tube (CRT)). The computer system 800 also includes an alpha-numeric input device 812 (e.g., a keyboard), a cursor control device 816 (e.g., a mouse, a drive unit 820, a signal generation device 840 (e.g., a speaker) and a network interface device 818.

The drive unit 820 includes a machine-readable medium 822 on which is stored one or more sets of instructions and data structures (e.g., instructions 824) embodying or utilized by any one or more of the methodologies or functions described herein. The instructions 824 may also reside, completely or at least partially, within the main memory 810 and/or within the processor 804 during execution thereof by the computer system 800, the main memory 810 and the processor 804 also constituting machine-readable media.

The instructions 824 may further be transmitted or received over a network 830 via the network interface device 818 utilizing any one of a number of well-known transfer protocols (e.g., FTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The above description is intended to be illustrative, and not restrictive. For example, the above-described embodiments (or one or more aspects thereof) may be used in combination with each other. Other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
receiving, at an Ethernet enabled device or interface, one or more access control entries generated based on fibre channel zoning information and information that identifies virtual ports of virtual machines so as to regulate communication between the virtual ports over virtual links comprising fibre channel over Ethernet frame;
inserting the one or more access control entries into an existing access control list;
receiving, at a virtual port of the Ethernet enabled device or interface, a fibre channel over Ethernet frame encoding a source media access control (MAC) address for a first virtual port associated with a source fibre channel identification and a destination MAC address for a second virtual port associated with a destination fibre channel identification;
referencing the access control list to determine whether the fibre channel over Ethernet frame is permitted to be received in accordance with an Ethernet protocol at the destination MAC address for the second virtual port; and
regulating, at the Ethernet enabled device or interface, a communication of the fibre channel over Ethernet frame based on the access control list, the source MAC address for the first virtual port and the destination MAC address for the second virtual port.

2. The method of claim 1, wherein the receiving of the one or more access control entries includes receiving the one or more access control entries at an Ethernet input-output port.

3. The method of claim 1, wherein the receiving of the one or more access control entries includes receiving the one or more access control entries at a location that is communicatively coupled to a link that communicatively couples the source MAC address with the destination MAC address.

4. The method of claim 3, wherein the referencing of the access control list includes sequentially checking access control entries for a match between one or more fields within the fibre channel over Ethernet frame and an access control entry.

5. The method of claim 4, further comprising:
allowing the fibre channel over Ethernet frame to be received at the destination MAC address if the match indicates the fibre channel over Ethernet frame should be permitted.

6. The method of claim 4, further comprising:
preventing the fibre channel over Ethernet frame from being received at the destination MAC address if the match indicates the fibre channel over Ethernet frame should be denied.

7. The method of claim 1, wherein the one or more access control entries include source MAC addresses for virtual ports associated with source fibre channel identification and destination MAC addresses for virtual ports associated with destination fibre channel identification.

8. The method of claim 7, wherein the referencing of the access control list includes sequentially checking access control entries for a match between one or more fields within the fibre channel over Ethernet frame and an access control entry.

9. A system comprising:
a physical interface including an Ethernet port to receive a fibre channel over Ethernet frame encoding a source media access control (MAC) address for a first virtual port associated with a source fibre channel identification and a destination MAC address for a second virtual port associated with a destination fibre channel identification;
referencing the access control list to determine whether the fibre channel; and
a database including an existing access control list, the physical interface further including an access control list module to:
receive, at the physical interface, one or more access control entries generated based on fibre channel zoning information and information that identifies virtual ports of virtual machines so as to regulate communication between the virtual ports over virtual links comprising fibre channel over Ethernet frame,
access the database to insert the one or more access control entries into the existing access control list,
reference the access control list to determine whether the fibre channel over Ethernet frame is permitted to be received in accordance with an Ethernet protocol at the destination MAC address for the second virtual port, and
regulate, at the physical interface including the Ethernet port, a communication of the fibre channel over Ethernet frame based on the access control list, the source MAC address for the first virtual port and the destination MAC address for the second virtual port.

10. The system of claim 9, wherein the one or more access control entries is received at an Ethernet input-output port.

11. The system of claim 9, wherein the one or more access control entries is received at a location that is communicatively coupled to a link that communicatively couples the source MAC address with the destination MAC address.

12. The system of claim 11, wherein the access control list is referenced by sequentially checking access control entries for a match between one or more fields within the fibre channel over Ethernet frame and an access control entry.

13. The method of claim 12, wherein the access control list module is further configured to allow the fibre channel over Ethernet frame to be received at the destination MAC address if the match indicates the fibre channel over Ethernet frame should be permitted.

14. The method of claim 12, wherein the access control list module is further configured to prevent the fibre channel over Ethernet frame from being received at the destination MAC address if the match indicates the fibre channel over Ethernet frame should be denied.

15. The apparatus of claim 9, wherein the one or more access control entries include source MAC addresses for virtual ports associated with source fibre channel identification and destination MAC addresses for virtual ports associated with destination fibre channel identification.

16. A non-transitory machine-readable storage medium embodying instructions which, when executed by a machine, cause the machine to perform operations comprising:
receiving, at an Ethernet enabled device or interface, one or more access control entries generated based on fibre channel zoning information and information that identifies virtual ports of virtual machines so as to regulate communication between the virtual ports over virtual links comprising fibre channel over Ethernet frame;

inserting the one or more access control entries into an existing access control list;

receiving, at a virtual port of the Ethernet enabled device or interface, a fibre channel over Ethernet frame encoding a source media access control (MAC) address for a first virtual port associated with a source fibre channel identification and a destination MAC address for a second virtual port associated with a destination fibre channel identification;

referencing the access control list to determine whether the fibre channel over Ethernet frame is permitted to be received in accordance with an Ethernet protocol at the destination MAC address for the second virtual port; and regulating, at the Ethernet enabled device or interface, a communication of the fibre channel over Ethernet frame based on the access control list, the source MAC address for the first virtual port and the destination MAC address for the second virtual port.

17. The machine-readable medium of claim 16, wherein the one or more access control entries is received at an Ethernet input-output port.

18. The machine-readable medium of claim 16, wherein the one or more access control entries is received at a location that is communicatively coupled to a link that communicatively couples the source media access control address with the destination MAC address.

19. The machine-readable medium of claim 18, wherein the access control list is referenced by sequentially checking access control entries for a match between one or more fields within the fibre channel over Ethernet frame and an access control entry.

20. The machine-readable medium of claim 19, wherein the access control list module is further configured to allow the fibre channel over Ethernet frame to be received at the destination MAC address if the match indicates the fibre channel over Ethernet frame should be permitted.

21. The machine-readable medium of claim 19, wherein the access control list module is further configured to prevent the fibre channel over Ethernet frame from being received at the destination MAC address if the match indicates the fibre channel over Ethernet frame should be denied.

22. The machine-readable medium of claim 16, wherein the one or more access control entries include source MAC addresses for virtual ports associated with source fibre channel identification and destination MAC addresses for virtual ports associated with destination fibre channel identification.

\* \* \* \* \*